United States Patent [19]
Close et al.

[11] Patent Number: 5,519,601
[45] Date of Patent: May 21, 1996

[54] PULSE-WIDTH MODULATED CIRCUIT FOR APPLYING CURRENT TO A LOAD

[75] Inventors: Eric C. Close, Valley Forge; Jerry K. Goff, Doylestown; Donald A. Yost, Willow Grove, all of Pa.

[73] Assignee: Performance Controls, Inc., Horsham, Pa.

[21] Appl. No.: 284,105

[22] Filed: Aug. 2, 1994

Related U.S. Application Data

[62] Division of Ser. No. 69,789, Jun. 1, 1993, Pat. No. 5,365,422.

[51] Int. Cl.$^6$ .................................. H02M 3/24; H02P 5/28
[52] U.S. Cl. ........................................... 363/98; 318/811
[58] Field of Search ..................... 363/17, 95, 97, 363/98, 131, 132; 318/811; 315/209 R, DIG. 7

[56] References Cited

U.S. PATENT DOCUMENTS

| | | | |
|---|---|---|---|
| 4,454,454 | 6/1984 | Valentine | 363/293 |
| 4,494,181 | 1/1985 | Ramlohr et al. | 363/63 |
| 4,562,386 | 12/1985 | Goff et al. | 363/97 |
| 5,070,292 | 12/1991 | Goff | 318/811 |
| 5,081,409 | 1/1992 | Goff | 318/811 |
| 5,291,388 | 3/1994 | Henrich | 363/98 |
| 5,309,078 | 5/1994 | Cameron | 318/811 |
| 5,379,209 | 1/1995 | Goff | 363/98 |
| 5,436,825 | 7/1995 | Wawra et al. | 363/132 |
| 5,442,540 | 8/1995 | Hua et al. | 363/98 |

OTHER PUBLICATIONS

*Switching Power Converters*, Peter Woods, published by Van Nostrand Reinhold Co., pp. 55–57, 1981.
Publication "DC and Brushless Motors and Control Systems", by Motion Control Seminars, pp. 7–7 thru 7–11, Feb. '84.
Brochure: "Compumotor and Digiplan . . . Product Technologies", by Parker Hannifin Corporation, May '92, p. A26.

*Primary Examiner*—Matthew V. Nguyen
*Attorney, Agent, or Firm*—William H. Eilberg

[57] ABSTRACT

A pulse-width modulated (PWM) circuit alternately applies voltage from a power supply across a load, and alternately establishes one or more non-powered, closed paths for freewheeling current. The circuit includes pairs of switches connected to the load and also connected to the power supply. PWM signals derived from a command signal drive the switches in such a manner as to create the freewheeling current paths in a desired pattern and sequence. The circuit effectively reduces ripple current in the load while also substantially reducing the amount of current flowing through the power supply filter capacitor. Thus, the size and rating of the power supply can be reduced. One can use the invention to drive a load in a multiple-phase environment, and also in the context of a three-phase trapezoidal drive.

7 Claims, 6 Drawing Sheets

PULSE-WIDTH MODULATED CIRCUIT FOR APPLYING CURRENT TO A LOAD

This is a division of application Ser. No. 08/069,789, filed Jun. 1, 1993, now U.S. Pat. No. 5,365,422.

BACKGROUND OF THE INVENTION

This invention relates to the field of pulse-width modulation systems for causing currents to flow through a load in response to a command signal. The invention is particularly useful in the field of motion control, such as in servo-amplifiers, brushless motors, and the like. It is also especially suitable for use in driving the gradient coils in a magnetic resonance imaging (MRI) system.

It has been known to control a motor with a servomechanism, wherein the current through the motor is held at a desired value, the desired value being represented by a command signal. The servomechanism regulates the current in the motor by comparing the command signal voltage with a feedback voltage, the latter being an appropriately scaled signal representative of the motor current. The difference between the command signal and the feedback signal is called the "error signal", and is used to drive an amplifier which applies current to the load.

Linear power amplifiers have been used for increasing the level of the error signal, so as to provide a signal capable of driving the motor. However, linear amplifiers dissipate power, and this power dissipation substantially reduces the efficiency of the system. A system which dissipates power must be provided with heat sinks, cooling fans, and similar apparatus, and the system's size and weight is therefore increased. The energy used to develop the power dissipated in the amplifier is wasted, increasing the overall cost of operation. Furthermore, excessive heat is known to shorten the useful lives of the semiconductor devices used in the amplifier.

Because of the above-described disadvantages of the linear amplifiers used to drive motors, it has been recognized that it is preferable to provide a power stage which does not dissipate power. A pulse-width modulated (PWM) circuit approaches this goal. In a pulse-width modulated circuit, the command signal is used to generate a train of pulses, the width of each pulse being related to the instantaneous value of the command signal. The pulses are generated by using a comparator to compare the command signal with a dither signal, which is a sawtooth or triangular wave. When the command signal exceeds the dither signal, the output of the comparator is high; at other times, the output of the comparator is low. The comparator output thus comprises the train of pulses representing the command signal.

The pulses are then used to drive an electronic switching device, such as one or more transistors, for intermittently applying a voltage across the load. When transistors are used as switches, they are either fully on (i.e. saturated) or fully off ("cut-off"). Thus, virtually no power is dissipated in the transistors, because when the transistors are saturated, there is almost no voltage drop, and when they are cut-off, there is negligible current flow. Thus, in effect, a PWM circuit comprises a switch for applying the voltage of the power supply across the load, wherein the switch does not itself consume appreciable power.

In practice, transistor switches do consume small amounts of power, because they are never totally cut-off or resistance-free. But the efficiency of a PWM circuit can be as high as about 90–95%, compared with only about 40% for linear amplifiers.

One problem associated with PWM circuits is current ripple. When a voltage is suddenly applied across an inductive and resistive load, such as an electric motor, the current through the motor rises almost linearly with time. When the voltage is then turned off, i.e. at the trailing edge of a voltage pulse, the current through the motor does not immediately fall to zero, but decreases with time, as the inductor's magnetic field collapses. Thus, the input voltage pulses applied across the load result in a current which has a ripple. This ripple is inherent to PWM amplifiers of the prior art. To some extent, the inductance of the motor acts as a filter for smoothing the ripple. The magnitude of the ripple is directly proportional to the supply voltage and inversely proportional to the switching frequency and the inductance of the motor. However, in most applications, the inductance of the motor and the power supply voltage are fixed. One way of reducing the ripple is therefore to increase the switching frequency. However, doing so increases switching losses in the transistor switches.

The amount of ripple is further increased by the fact that, in PWM circuits of the prior art, the maximum voltage excursion is twice the magnitude of the supply voltage. Thus, if the supply voltage is designated as V, the switching network which produces the pulses alternately applies voltages of +V and −V across the load. Thus, the maximum excursion is 2 V. The greater the voltage excursion, the greater the current ripple.

Current ripple is undesirable because it wastes energy in the motor. The ripple current waveform has both an average value and an rms value. The motor can respond only to the average current. If the current has any ripple, the rms value is larger than the average value. The difference between the rms current and the average current contributes only to wasteful heating of the motor, thus reducing efficiency. In order to achieve maximum efficiency, the average and rms currents must be equal. This condition occurs only when there is no ripple, i.e. when there is a constant DC waveform.

U.S. Pat. Nos. 5,070,292 and 5,081,409 describe systems which reduce the problem of ripple in a PWM circuit. This specification hereby incorporates by reference the disclosures of the latter patents. The latter patents show systems and methods which substantially reduce the ripple without increasing the actual switching frequency.

The present invention provides a circuit which further reduces the ripple current described above, but which does so with fewer circuit components, and in a manner which substantially reduces the overall load on the power supply. The invention also has the effect of increasing the effective bandwidth of the circuit while reducing electromagnetic interference (EMI). The invention also increases the efficiency of the amplifier.

SUMMARY OF THE INVENTION

In one embodiment, the present invention comprises a circuit including four switches, each switch being connected to a power supply and to a load. Each switch is driven by a pulse-width modulated (PWM) signal. One derives a basic PWM signal from an error signal which represents the change in the current desired to flow through the load. From this basic PWM signal one derives other PWM signals, which can be related to the basic PWM signal in a manner described in detail later. Together, these PWM signals control the switches such that, at certain periods in time, the switches open a path for current to flow from the power supply, through the load, and back to the power supply. At other periods, the switches define a closed path for current flow through the load, which path excludes the power supply. During the latter periods, current may flow through a "bottom" or a "top" path while excluding the power supply. These different conditions alternate with each other, so that at one moment, the switches connect the power supply across the load, and at the next moment, the circuit allows current to continue to flow, but only through one of the closed, non-powered, "freewheeling" paths. The result is a circuit having the advantage of reduced ripple, together with other advantages mentioned above. The circuit of the present invention enjoys similar advantages to those provided by the above-cited patents, but it has fewer components, and it also reduces the power required from the power supply. Thus, the circuit of the present invention operates much more efficiently than comparable circuits of the prior art.

One can also vary the configuration of the pulses so as to change the current paths. For example, one can provide a circuit in which current flows first from the power supply to the load and back, then through a first freewheeling path, then through a second freewheeling path, and so on. One can vary this arrangement, changing the order of connection of the freewheeling paths, and changing the order in which current flows through the path including the power supply.

In another embodiment, one applies the invention, as described above, to a three-phase trapezoidal drive. In a trapezoidal drive, the circuit includes three loads, all connected together at a common point. For a given period of time, the system applies a voltage across a series combination of two of the loads, with the third load being disconnected. During the latter period, the series combination of loads becomes connected to switches which operate in exactly the same manner described above. During other periods, other combinations of loads become active, and each such combination becomes connected to switches that perform the functions described above.

In another embodiment, one can generalize the present invention to the case of an N-phase load, where N is a positive integer greater than two. In this case, N loads are connected together at a common point, with the opposite end of each load being connected between a pair of switches. Each pair of switches is connected to the power supply. A multiple-phase dither signal generates the pulses which control the switches.

The present invention therefore has the primary object of providing a pulse-width modulated (PWM) circuit which applies a voltage across a load.

The invention has the further object of providing a PWM circuit as described above, wherein the circuit minimizes the amount of current ripple in the load.

The invention has the further object of providing a PWM circuit which minimizes the amount of power required from a power supply.

The invention has the further object of increasing the efficiency of PWM circuits for applying currents to a load.

The invention has the further object of increasing the bandwidth of a PWM circuit.

The invention has the further object of reducing electromagnetic interference (EMI).

The reader skilled in the art will recognize other objects and advantages of the present invention, from a reading of the following brief description of the drawings, the detailed description of the invention, and the appended claims.

DETAILED DESCRIPTION OF THE INVENTION

Figure 1:
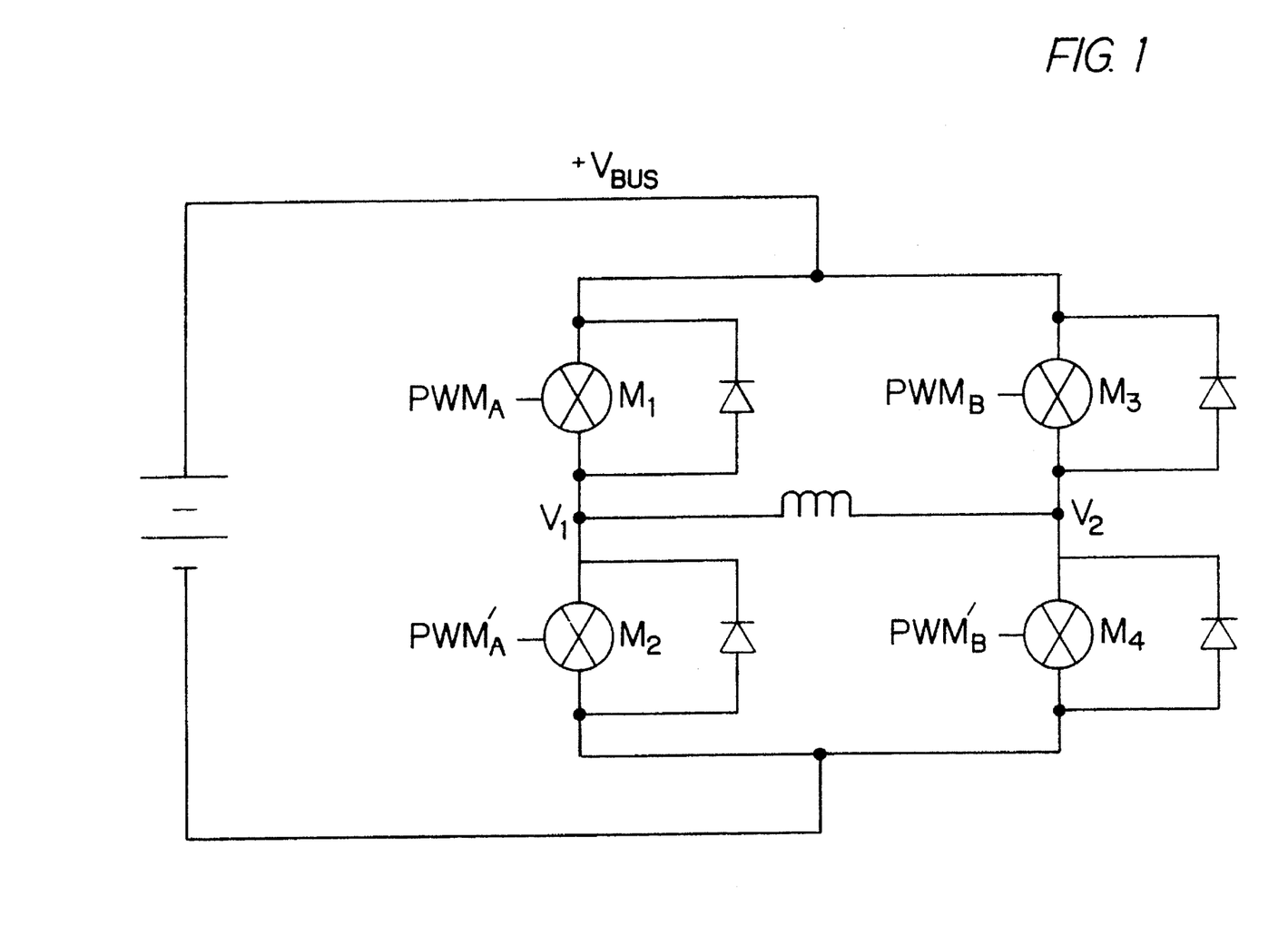
FIG. 1 shows a schematic diagram of the PWM circuit of the present invention.

FIG. 1 provides a schematic diagram of the basic circuit used in the present invention. The circuit includes four switches, designated as M1, M2, M3, and M4. These switches can comprise transistors (such as field effect transistors (FETs)) or other equivalent electronic switching devices. The circuit includes load L, represented symbolically as an inductor because the load typically comprises one or more windings of a motor. The circuit is connected to a source of power, as shown. FIG. 1 shows the power source as a battery, for simplicity of illustration, but it is understood that the invention can be used with other power supply configurations. A pulse-width modulated (PWM) signal controls each switch. Signal $PWM_A$ controls M1; signal $PWM_A'$ controls M2; signal $PWM_B$ controls M3; and signal $PWM_B'$ controls M4.

FIG. 1 illustrates each switch with a diode connected across the switch. If the switches comprise FETs, these diodes can be the parasitic diodes which are inherent components of every FET. If the switches comprise other types of semiconductor devices, these diodes may be actual components connected across the switches. In either case, the diodes cause current to flow in the directions indicated in the explanation given below. For purposes of discussion, one can view each diode as an integral part of its accompanying switch. Thus, the following discussion will speak of current flowing through a particular switch, even though the current in a particular case may actually be flowing through the diode. A more precise description of the current paths will be given later, when the four basic cases of current flow are enumerated.

FIG. 2 shows the derivation of the PWM signals used to drive the switches of FIG. 1. One begins with the error signal $I_{err}$, which represents the current with which one desires to drive the motor. Using a circuit such as that described more fully in U.S. Pat. No. 5,081,409, or its equivalent, one compares $I_{err}$ with the triangular dither signal Tri to obtain the signal $PWM_A$. In particular, one connects the signal $I_{err}$ and the dither signal to the inputs of a comparator, and the output of the comparator becomes high only when $I_{err}$ exceeds Tri. In this case, the output of the comparator appears as shown in the waveform labeled $PWM_A$. Thus, the output of the comparator comprises the pulse train $PWM_A$. FIG. 2a shows the dither signal and the signals $I_{err}$ and $-I_{err}$. FIG. 2b shows the pulse train $PWM_A$.

Figure 2A:
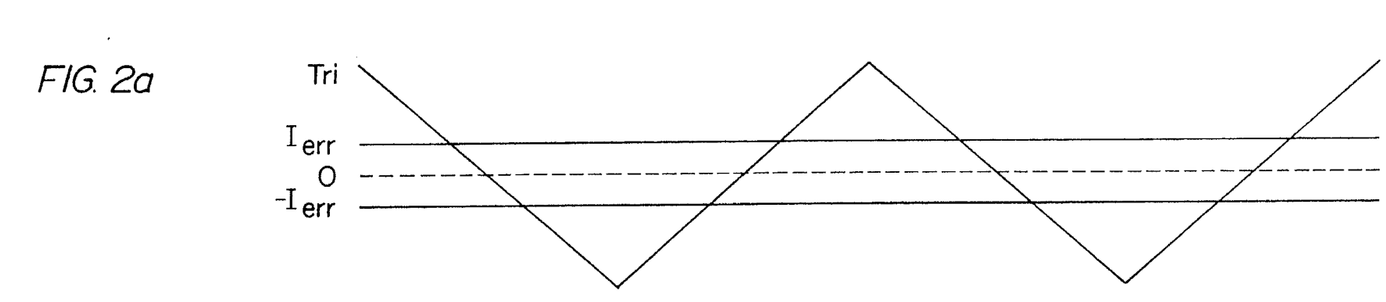
FIGS. 2a–2g shows a set of waveform diagrams illustrating the derivation of the pulses used to drive the switches in the circuit of the present invention, and also showing the voltage applied to, and the current through, the load.
Figure 2B:
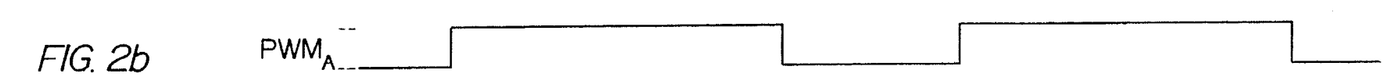
Figure 2C:
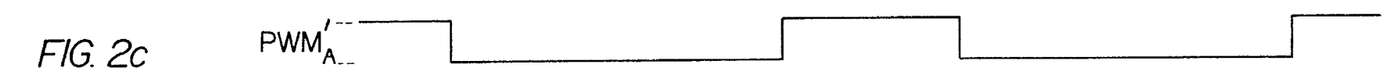

The pulse train $PWM_A'$ comprises the complement of $PWM_A$, and is illustrated in FIG. 2c; when $PWM_A$ goes high, $PWM_A'$ goes low, and vice versa.

Figure 2D:
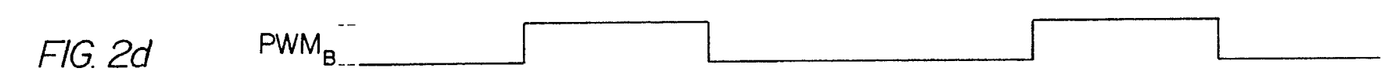
Figure 2E:
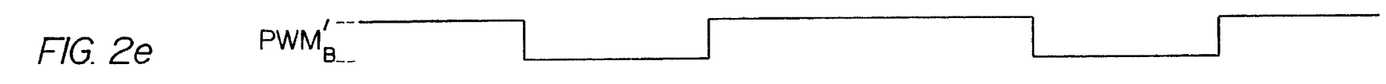

One derives pulse train $PWM_B$ by comparing the negative of the error signal $-I_{err}$ with the dither signal. When $-I_{err}$ exceeds the dither signal, $PWM_B$ becomes high; at all other times, $PWM_B$ remains low. The pulse train $PWM_B'$ comprises the complement of $PWM_B$. FIGS. 2d and 2e show the pulse trains $PWM_B$ and $PWM_B'$, respectively.

Note that $PWM_A$ and $PWM_B$ are, strictly speaking, independent of each other. $PWM_A$ and $PWM_B$ comprise signals derived by sampling the error signal at different times. Since, in general, one does not know in advance how the error signal changes with time, the value of $PWM_A$ cannot predict the value of $PWM_B$ with certainty. However, in a modification of the invention, one could derive a $PWM_B$ signal by interpolation, since a knowledge of the value of $PWM_A$ can provide at least an approximate knowledge of what $PWM_B$ should be. The latter modification could yield satisfactory results, but would not enjoy the bandwidth advantages of the embodiment described above.

Now consider the case in which $I_{err}$ is positive, and in which current flows through the load from left to right in FIG. 1 (called the "positive" direction). Begin with the moment when the dither signal first falls below $I_{err}$, i.e. the moment at which $PWM_A$ first becomes high. Then M1 and M4 conduct, and M2 and M3 are cut-off. Current flows from the power supply, through M1, through the load, through M4, and back to the power supply.

The next change in the PWM pulses occurs when the dither signal falls below $-I_{err}$. $PWM_B$ becomes high and $PWM_B'$ becomes low, while $PWM_A$ and $PWM_A$ are unchanged. Now M1 and M3 conduct, while M2 and M4 are cut-off. At this moment, the only effective closed circuit which includes the load is the loop consisting of M1, M3, and the load. In other words, the upper loop in FIG. 1 constitutes the closed circuit. This loop does not include the power supply. However, due to the fact that current had been flowing through the load, in the positive direction, immediately before the dither signal fell below $-I_{err}$, current continues to flow through the load (since it cannot stop instantaneously) and such current flows through the closed path represented by the upper loop in FIG. 1. One calls this current a "freewheeling" current.

The next change occurs when the dither signal first rises above the level of $-I_{err}$. $PWM_B$ becomes low, while $PWM_A$ remains high. Therefore, M1 and M4 conduct, and M2 and M3 are cut-off. Current again flows from the power supply, through M1, through the load, through M4, and back to the power supply.

The next change occurs when the dither signal first rises above the level of $I_{err}$. $PWM_A$ becomes low, while $PWM_B$ remains low. Therefore, M2 and M4 conduct, and M1 and M3 are cut-off. At this time, the only path for current through the load comprises the closed loop consisting of M2, M4, and the load. Freewheeling current therefore flows through the load.

When the dither signal next falls below $I_{err}$, the above-described process repeats, as graphically illustrated by the pulse diagrams of FIG. 2.

Thus, the overall effect of the arrangement described above is that a voltage is applied to the load during discrete periods of time, and a freewheeling current flows through the load during other times. More specifically, in the arrangement described above, the freewheeling current paths alternate between the upper loop and the lower loop, with all freewheeling periods alternating with periods during which the power supply is connected to the load.

Figure 2F:
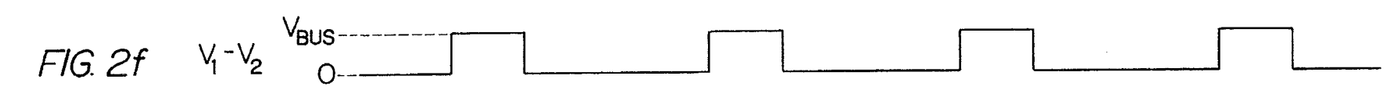
Figure 2G:
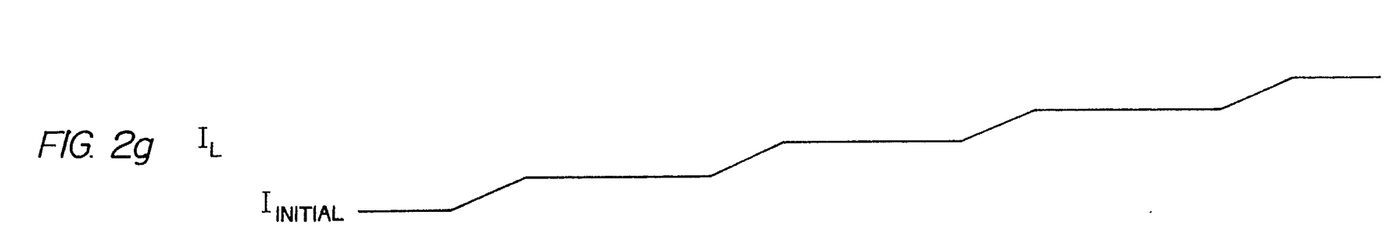

FIG. 2f represents $V_1-V_2$, the voltage applied across the load. Note that this voltage comprises the bus voltage, i.e. the full voltage of the power supply, during the certain times, and zero at other times (i.e. during the periods of freewheeling current). FIG. 2g illustrates the current through the load. Note that this current becomes more positive when the power supply is connected to the load, and that the current changes at a constant rate (determined by di/dt which equals $V_{bus}$ divided by the load inductance). The current through the load is essentially constant during the freewheeling periods. Of course, it is assumed that the frequency of the dither signal is sufficiently great to produce pulses having periods very small compared to the time constant of the load, so that, during the freewheeling period, the current can be considered constant.

The arrangement described above actually represents one of four possible cases. In the first case, the current through the load flows in a positive direction, and one seeks to make that current more positive. In the second case, the current through the load is positive, but one seeks to make the current more negative. In the third case, the current through the load flows in the negative direction, and one seeks to make that current more positive. In the fourth case, the load current is negative, and one seeks to make that current more negative. In each case, the circuit arrangement is the same as shown in FIG. 1; the differences from one case to another reside in the sign of the error signal $I_{err}$ and in the assumption concerning the initial direction of load current.

For the sake of clarity, the explanation given above omits details about the precise path of current flow. In particular, the above discussion was not concerned with whether current flows through the switch itself or through the diode connected to the switch. The following paragraphs describe the exact paths of current flow, rigorously, for each case. In the following discussion, the term "switch portion of M1" refers to the switch itself, while the the term "diode portion" refers to the diode connected across the switch, whether that diode is a parasitic diode of a FET or an actual component connected across some other type of electronic switch.

a) Case 1 - Positive Load Current, $I_{err}>0$

This is the case illustrated in FIG. 2. When $PWM_A$ first goes high, the current path is as described above, namely from the power supply, through the switch portion of M1, through the load, through the switch portion of M4, and back to the power supply. When $PWM_B$ next goes high, current flows from the load, through the diode portion of M3, through the switch portion of M1, and back to the load. When $PWM_B$ then goes low, current again flows from the power supply, through the switch portion of M1, through the load, and through the switch portion of M4, as before. Then when $PWM_A$ goes low, current flows from the load, through the switch portion of M4, through the diode portion of M2, and back to the load.

b) Case 2 - Positive Load Current, $I_{err}<0$

The pulse diagram for this case can be derived from FIG. 2, by interchanging $I_{err}$ and $-I_{err}$. The result is that the pulses driving M1 and M2 become interchanged with those driving M3 and M4. In other words, FIG. 2b changes place with FIG. 2d and FIG. 2c changes place with FIG. 2e.

When $PWM_B$ first goes high, current flows from the power supply, through the diode portion of M2, through the load, through the diode portion of M3, and back to the power supply. When $PWM_A$ next goes high, current flows from the load, through the diode portion of M3, through the switch portion of M1, and back to the load. When PWM$_A$ next goes low, current flows again from the power supply, through the diode portion of M2, through the load, through the diode portion of M3, and back to the power supply. When PWM$_B$ next goes low, current flows from the load, through the switch portion of M4, through the diode portion of M2, and back to the load.

c) Case 3 - Negative Load Current, I$_{err}$>0

In this case, the pulses of FIG. 2 are used, because I$_{err}$ is positive. The only difference is that the current in the load is assumed to be flowing in the negative direction (from right to left in FIG. 1).

When PWM$_A$ first goes high, current flows from the power supply, through the diode portion of M4, through the load, through the diode portion of M1, and back to the power supply. When PWM$_B$ next goes high, current flows from the load, through the diode portion of M1, through the switch portion of M3, and back to the load. When PWM$_B$ then goes low, current again flows from the power supply, through the diode portion of M4, through the load, and through the diode portion of M1, as before. Then when PWM$_A$ goes low, current flows from the load, through the switch portion of M2, through the diode portion of M4, and back to the load.

d) Case 4 - Negative Load Current, I$_{err}$<0

In this case, the pulses are as in Case 2, because I$_{err}$ is negative. The current in the load is assumed to be flowing in the negative direction (from right to left in FIG. 1).

When PWM$_B$ first goes high, current flows from the power supply, through the switch portion of M3, through the load, through the switch portion of M2, and back to the power supply. When PWM$_A$ next goes high, current flows from the load, through the diode portion of M1, through the switch portion of M3, and back to the load. When PWM$_A$ next goes low, current flows again from the power supply, through the switch portion of M3, through the load, through the switch portion of M2, and back to the power supply. When PWM$_B$ next goes low, current flows from the load, through the switch portion of M2, through the diode portion of M4, and back to the load.

In all four cases, power is applied to the load at discrete intervals, these intervals alternating with intervals during which current flows in a non-powered, freewheeling current loop.

In the example given above, the pattern of current flow is that freewheeling current flows first through the upper loop, then through the lower loop, then through the upper loop, and so on, with each period of freewheeling current alternating with a period during which power is applied to the load. Many other patterns of current flow can be devised, within the scope of this invention. For example, FIG. 3 illustrates a case in which freewheeling current flows only through the bottom loop.

Figure 3:
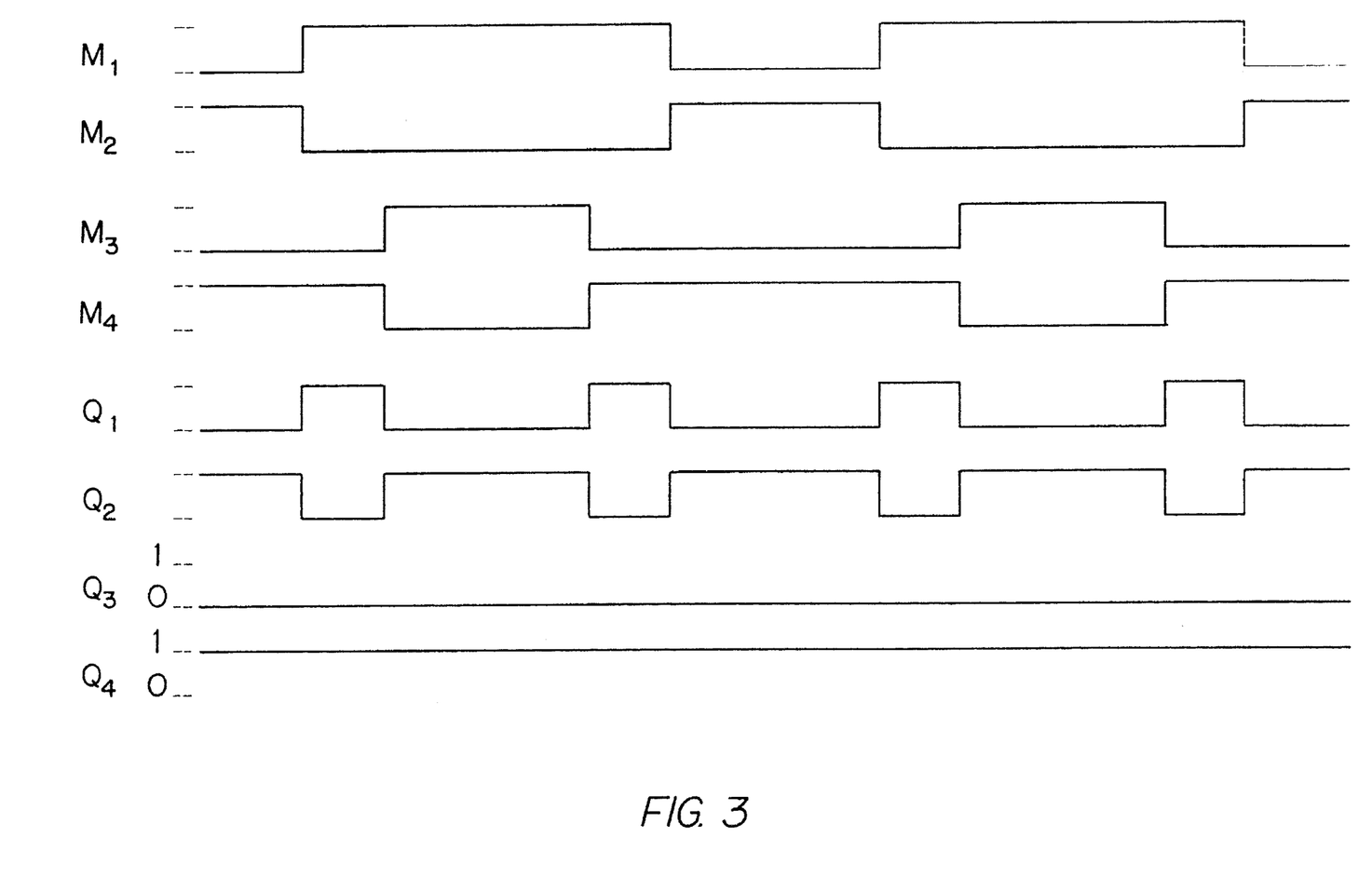
FIG. 3 shows a set of pulse diagrams representing the condition wherein freewheeling current occurs only in the bottom circular path of the PWM circuit of FIG. 1.

In FIG. 3, the pulses labeled M1, M2, M3, and M4 are the same as the pulses shown in FIGS. 2b, 2c, 2d, and 2e respectively (assume a positive I$_{err}$). Pulses Q1, Q2, Q3, and Q4 are derived from M1, M2, M3, and M4 according to the following logical (Boolean) operations:

$Q1=M1 \cdot M4$ $Q2=(M1 \cdot M4)'$ $Q3=M2 \cdot M3$ $Q4=(M2 \cdot M3)'$ where "·" means a logical AND. If the pulses Q$_i$ are applied to the switches of FIG. 1, in place of the M$_i$, one can easily verify that the freewheeling current flows only in the bottom loop. Note that in the example shown in FIG. 3, Q$_3$ is always low and Q$_4$ is always high.

In general, one can design a set of pulses which causes freewheeling current to flow in any desired loop. The following Boolean expressions show how to compute the Q$_i$ from the M$_i$, the Q$_i$ being signals to be applied to control the switches in place of the M$_i$. One computes the Q$_i$ as follows:

$Q1=(M1 \cdot M4) \cdot T'+(M2 \cdot M3)' \cdot T$ $Q2=(M1 \cdot M4)' \cdot T'+(M2 \cdot M3) \cdot T$ $Q3=(M2 \cdot M3) \cdot T'+(M1 \cdot M4)' \cdot T$ $Q4=(M2 \cdot M3)' \cdot T'+(M1 \cdot M4) \cdot T$ where T is a Boolean variable having the value 1 when one desires freewheeling current to flow in the upper loop, and 0 when the freewheeling current should flow in the lower loop. Note that the above equations reduce to those shown in the example represented in FIG. 3, where T=0.

The variable T can be toggled on and off at will. Thus, the pattern of freewheeling current flow can be varied in an infinite number of ways. One can implement the above equations with an equivalent logical circuit which converts the pulses M$_i$ into pulses Q$_i$, using the additional variable T as an input. In this way, one can establish a freewheeling current path in different loops, in any different order.

Figure 4A:
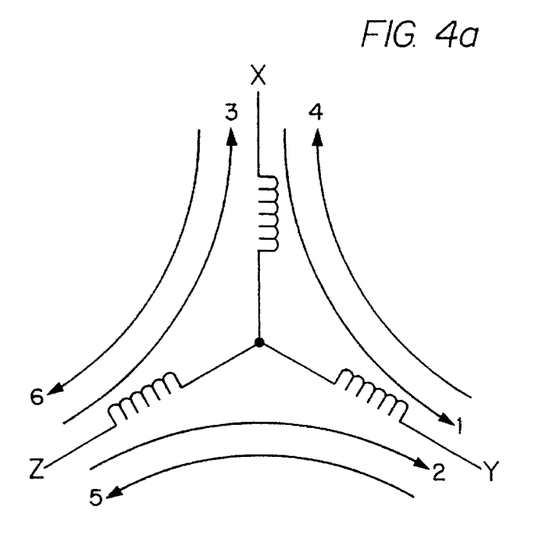
FIGS. 4a–4c provides diagrams illustrating the implementation of the present invention with a three-phase trapezoidal drive.
Figure 4B:
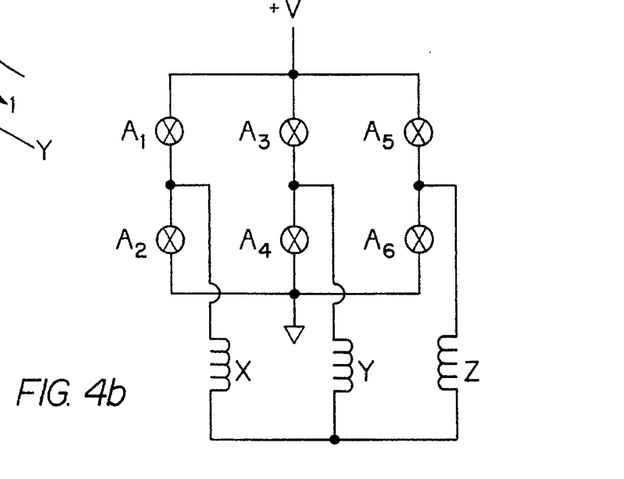
Figure 4C:
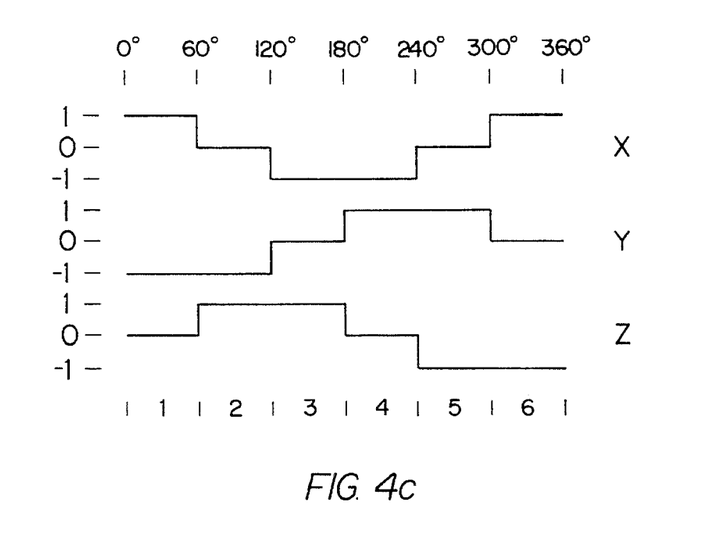

One can use the present invention with a three-phase trapezoidal drive, as illustrated in FIG. 4. In a three-phase trapezoidal drive, three inductors are connected together at one point, as shown in FIG. 4a. In the example shown, a full cycle, comprising 360° of shaft rotation, is divided into six periods, each lasting for 60°. During each such period, one of the inductors is disabled, so that the effective load, during that period, comprises the series combination of the other two inductors. FIG. 4c shows pulses which determine which inductors are active, and in which direction current will flow. In the convention of FIG. 4c, a zero value means that an inductor is disabled, and it is assumed that current flows from the inductor associated with a positive (+1) pulse to the inductor associated with a negative (−1) pulse, for a positive current command. For example, for the first 60° of the cycle, current flows from x to y, with z being disabled. For the second 60°, current flows from z to y, with x being disabled. For the third 60°, current flows from z to x, with y being disabled.

FIG. 4b shows the three inductors connected to pairs of switches. Suppose, first, that the system is within the first 60° of the cycle. Then the load comprises the series combination of x and y, with current flowing in the positive direction. Inductor z is disabled and can be disregarded. During this period, switches A1, A2, A3, and A4, to which inductors x and y are connected, assume the same roles as switches M1, M2, M3, and M4 in FIG. 1, and are controlled in exactly the same ways as described above.

In another example, suppose that the system is within the third 60° segment of the cycle. Current therefore flows from z to x, with inductor y being disabled. Switches A5, A6, A1, and A2 now correspond to the switches M1, M2, M3, and M4, respectively, of FIG. 1, and are controlled in exactly the same ways as described above.

The circuit of FIG. 4 functions similarly for all of the other cases.

In FIG. 4, one assumes that the duration of each 60° segment is much greater than the period of the PWM pulses used to control the switches. In general, the PWM switching rate is much greater than the rate of trapezoidal state change.

The trapezoidal state change rate is proportional to the angular velocity of a motor shaft. Also, note that the use of 60° segments is an example only, and the cycle could be divided into segments of greater or lesser size.

Figure 5A:
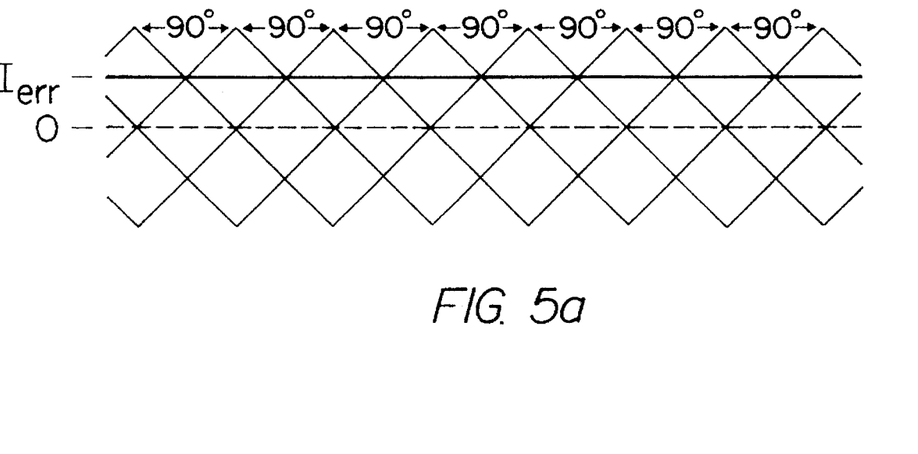
FIG. 5a–5b shows the derivation of pulses used to drive the switches in a multiple-phase embodiment of the present invention.
Figure 5B:
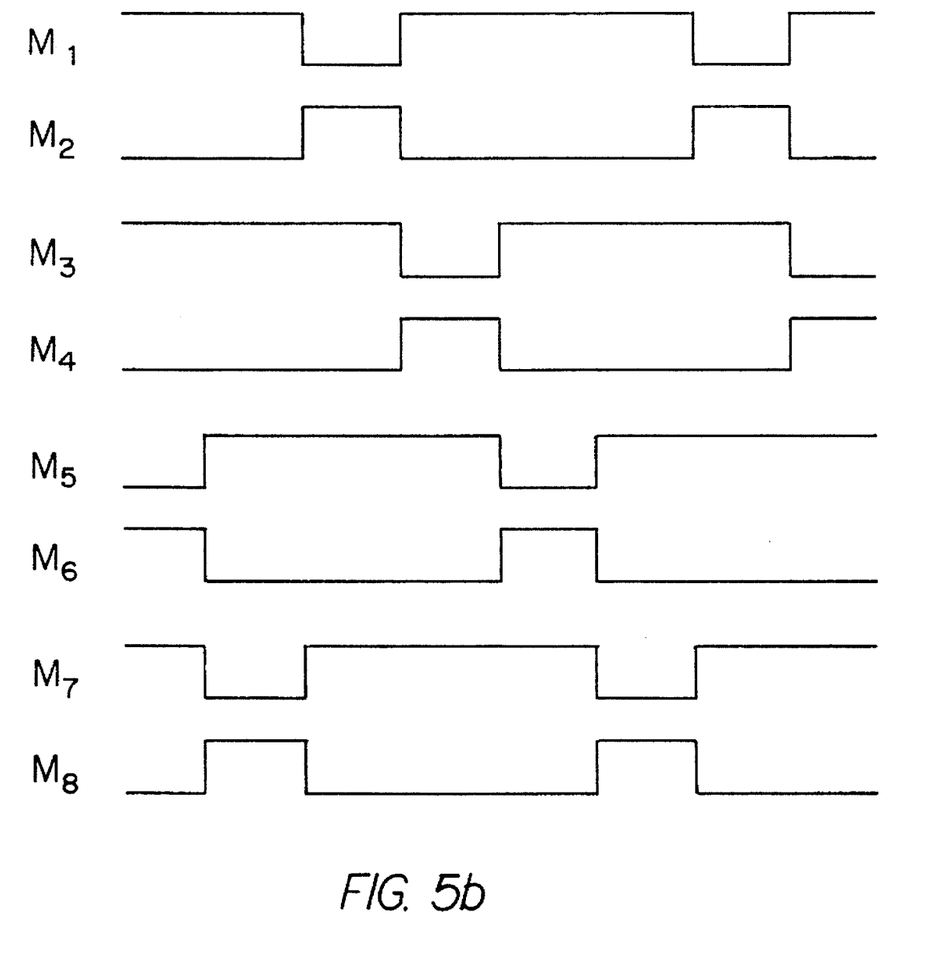
Figure 6:
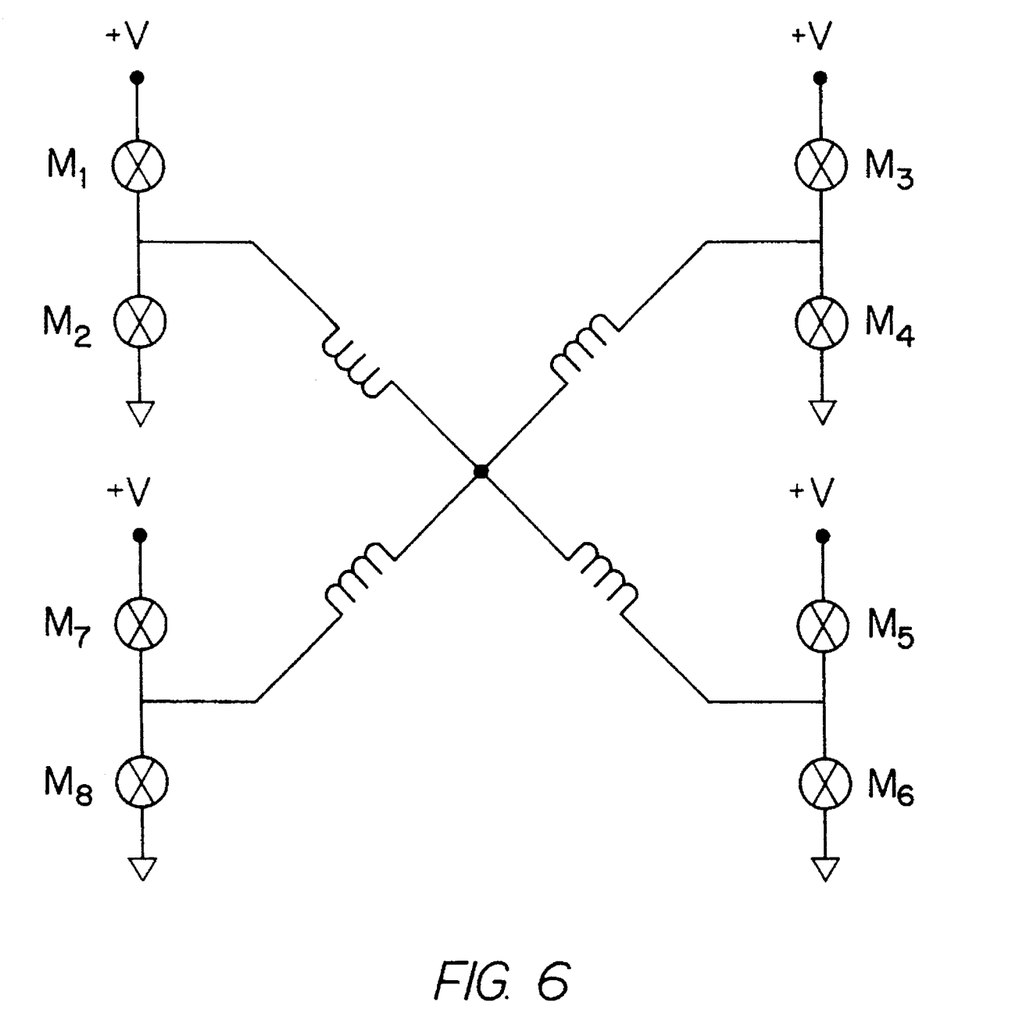
FIG. 6 provides a schematic diagram of the PWM circuit in the multiple-phase embodiment.

FIGS. 5 and 6 show how one can generalize the invention to the case of N phases, where N is an integer greater than 2. Note that the three-phase trapezoidal drive is not the same as the case of N=3 in FIGS. 5 and 6; the trapezoidal drive is really a special case. For purposes of clarity, FIG. 5 shows the derivation of pulses only for the case of N=4, but the case of N=4 clearly suggests how the method can be generalized, and the procedure is the same for other values of N.

In the general case of N phases, one defines a separate dither signal for each phase. In the notation of FIGS. 5 and 6, the terms M2, M3, M4, M5, M6, M7, and M8 represent the PWM signals used to drive the switches, or they can represent the switches themselves.

In general, the most effective phase separation, in degrees, between dither signals is 360°/N. In the case of N=4, the dither signals are therefore preferably spaced 90° apart, as illustrated in FIG. 5a. By comparing the error signal $I_{err}$ with the first dither signal, one derives the pulses for M1, with M2 being defined as the complement of M1, as shown in FIG. 5b. Similarly, one derives the pulses for M3 by comparing $I_{err}$ with the second dither signal, with M4 being the complement of M3. One derives M5 and M7 (and their respective complements) by comparing $I_{err}$ with the third and fourth dither signals.

FIG. 6 shows the circuit used for the case of N=4. The pulses labeled M1 through M8, from FIG. 5b, are applied to the respective switches bearing similar labels in FIG. 6. There are N=4 inductors, connected together at a point, with each inductor being connected between two switches, as shown. Each pair of inductors in FIG. 6 can be viewed as a single load connected to four switches, in the same manner as shown in FIG. 1, the switches being controlled by the pulses indicated in FIG. 5b. The difference is that in FIG. 6, the various phases operate simultaneously.

One can easily generalize the arrangement of FIGS. 5 and 6. For any integer N greater than 2, one provides N inductors, all of the inductors being connected at a common point, each of the inductors being connected, at the other end, to a pair of switches. Each pair of switches is driven by a pair of pulse trains, one of the pulse trains being derived by comparing $I_{err}$ with one of the dither signals, and the other pulse train being the complement of the first.

Note that one may also implement a circuit with non-optimal phase separation, i.e. a phase separation different from 360°/N. In this case, the circuit would yield only partially effective results.

The present invention has the advantage that it substantially reduces the effective current carried by the bus capacitor of the power supply. In a conventional PWM switching system, the current through the bus capacitor (or filter capacitor) approximately equals the load current at all times. But in the present invention, the load on the bus capacitor is related to the duty cycle of the PWM signals and on the current in the load. One can show that for a duty cycle of 50%, the rms current in the bus capacitor is ideally zero, and as the duty cycle deviates from 50%, the current in the bus capacitor increases, so that for either a 0% or 100% duty cycle, the bus capacitor rms current equals the load current. Thus, for most operating conditions, the rms current flowing through the bus capacitor is considerably less than in the prior art. This fact allows one to reduce the performance requirements of the bus capacitor and power supply. Specifically, because of the decrease in the current requirements of the capacitor, one can use smaller and less expensive capacitors.

The present invention also enjoys the same advantages obtained by the circuits of U.S. Pat. Nos. 5,070,292 and 5,081,409, but with fewer components. Thus, the ripple current through the load is greatly reduced as compared to other systems of the prior art, as the effective switching frequency is substantially increased without an actual increase in the basic frequency of the dither signal.

While the invention has been described with respect to specific embodiments, one can modify the invention in many ways. The invention is not necessarily limited to use with inductive loads. The dither signals used to generate the various pulses can be phased differently, although the phase separation given above is preferred.

Note that the invention can be practiced with a command signal that is either analog or digital. In the analog case, an analog feedback signal is compared with an analog command signal to produce an analog error signal, which is then compared with an analog dither signal. In the digital case, an analog feedback signal is digitized and then compared digitally with a digitized form of the command signal, to produce a digital error signal. The digital error signal is then compared, digitally, with a digital dither signal. In both cases, the comparison between the error signal and the dither signal yields the pulses described above, and the invention works the same way in both cases. The invention is not limited to either case.

Moreover, one can create a fully digital implementation of the invention which enjoys all of the aforementioned advantages of the analog implementation. The fully digital implementation includes a direct numerical calculation of the PWM waveforms without reference to a dither signal. Thus, if a direct numerical calculation technique is used, one does not need to derive a dither signal. The invention would be otherwise similar to what is described above.

A fully digital implementation would be especially useful in practicing the alternative, mentioned above, wherein the PWM signals are not truly independent. That is, one could digitally calculate an "expected" $PWM_B$ signal from a known $PWM_A$ signal, and could use these signals to control the switches, as before.

The above-described modifications, and others which will be apparent to those skilled in the art, should be considered within the spirit and scope of the following claims.

What is claimed is:

1. In a pulse-width modulated circuit for varying the flow of current through a three-phase load, the load including three inductors connected together at a point, the circuit including means for successively activating different pairs of the inductors while deactivating the inductor which does not form part of a selected pair, the improvement comprising:

a) switching means for connecting the selected pair of inductors to a source of power such that current flows through the selected pair of inductors, b) the switching means also including means for connecting the selected pair of inductors to at least one closed circuit which does not include the power source, wherein current flowing through the selected pair of inductors can continue to flow through said closed circuit, and c) pulse means for controlling the switching means such that, for at least a portion of an operating cycle, the selected pair of inductors is connected to the power source, and for the remainder of the operating cycle the selected pair of inductors is connected to at least one of said closed circuits.

2. A circuit for applying current to a load, the circuit comprising:

a) a power supply, b) four switches, all of the switches having at least two terminals, one terminal of each switch being connected to the power supply and the other terminal being connected to the load, wherein the switches comprise means for defining paths for current from the power supply, to the load, and back to the power supply, and wherein the switches also comprise means for defining at least one closed path for current flow, wherein said closed path excludes the power supply, and c) means for generating pulse-width modulated signals, wherein said signals control the switches, and wherein the signals are arranged such that they alternate between providing a path for current from the power supply through the load and back to the power supply, and establishing said closed path which excludes the power supply, wherein there are at least two independent pulse-width modulated signals for controlling the switches, wherein the four switches are selected by a trapezoidal drive which comprises means for momentarily activating selected groups of four switches, and wherein the load comprises a series combination of loads selected by the trapezoidal drive.

3. A circuit for applying current to a load, the circuit comprising:

a) a power supply, b) a plurality of switches, all of the switches being connected to the power supply and to the load, wherein the switches comprise means for defining paths for current from the power supply, to the load, and back to the power supply, and wherein the switches also comprise means for defining at least two closed paths for current flow, wherein said closed paths exclude the power supply, and c) means for opening and closing the switches, wherein the opening and closing means comprises means for establishing at least one current path from the power supply through the load and back to the power supply, and for establishing either of said closed paths which exclude the power supply, wherein the switches are selected by a trapezoidal drive which comprises means for momentarily activating selected groups of switches, and wherein the load comprises a series combination of loads selected by the trapezoidal drive.

4. A circuit for applying current to a load, the circuit comprising:

a) a power supply, b) a plurality of switches, all of the switches being connected to the power supply and to the load, wherein the switches comprise means for defining paths for current from the power supply, to the load, and back to the power supply, and wherein the switches also comprise means for defining at least one closed path for current flow, wherein said closed path excludes the power supply, and c) at least two independent means for opening and closing the switches, wherein the opening and closing means comprise means for establishing at least one current path from the power supply through the load and back to the power supply, and for establishing said closed path which excludes the power supply, wherein the switches are selected by a trapezoidal drive which comprises means for momentarily activating selected groups of switches, and wherein the load comprises a series combination of loads selected by the trapezoidal drive.

5. A pulse-width modulated circuit for varying the flow of current to a load, the circuit comprising:

a) switching means for connecting the load to a source of power such that current flows through the load, b) the switching means also including means for connecting the load to at least one closed circuit which does not include the power source, wherein current flowing through the load can continue to flow through said closed circuit, and c) at least two independent pulse means for controlling the switching means such that, for at least a portion of an operating cycle, the load is connected to the power source, and for another portion of the operating cycle the load is connected to at least one of said closed circuits, wherein the switching means are selected by a trapezoidal drive which comprises means for momentarily activating selected groups of switching means, and wherein the load comprises a series combination of loads selected by the trapezoidal drive.

6. A method of applying current to a load, the method comprising the steps of:

a) configuring a plurality of switches connected between the load and a power supply so that current flows from the power supply to the load and back to the power supply, b) reconfiguring the switches such that current flows through the load in a closed loop which excludes the power supply, and c) alternately repeating steps (a) and (b), wherein step (b) is performed alternately with different closed loops, wherein the switches are selected by a trapezoidal drive which comprises means for momentarily activating selected groups of switches, and wherein the load comprises a series combination of loads selected by the trapezoidal drive.

7. A method of applying current to a load, the method comprising the steps of:

a) configuring a plurality of switches connected between the load and a power supply so that current flows from the power supply to the load and back to the power supply, b) reconfiguring the switches such that current flows through the load in a closed loop which excludes the power supply, and c) repeating steps (a) and (b) such that step (b) is performed at least once between successive repetitions of step (a), and such that current flows in different closed loops which exclude the power supply, wherein the switches are selected by a trapezoidal drive which comprises means for momentarily activating selected groups of switches, and wherein the load comprises a series combination of loads selected by the trapezoidal drive.

* * * * *